United States Patent Office 3,557,127
Patented Jan. 19, 1971

3,557,127
SUBSTITUTED CYCLOHEXENES, DERIVATIVES THEREOF AND PROCESSES FOR OBTAINING SAME
Gerhard Satzinger, Gundelfingen-Freiburg, Germany, assignor to Warner-Lambert Pharmaceutical Company, Morris Plains, N.J., a corporation of Delaware
No Drawing. Continuation-in-part of application Ser. No. 777,197, Nov. 19, 1968, which is a continuation-in-part of application Ser. No. 587,673, Oct. 19, 1966, and a continuation-in-part of application Ser. No. 690,794, Dec. 15, 1967, which in turn is a continuation-in-part of application Ser. No. 587,673, Oct. 19, 1966. This application Apr. 3, 1969, Ser. No. 813,268
Claims priority, application Germany, Nov. 19, 1965, 1,518,959; June 8, 1967, 1,618,476; June 23, 1967, 1,618,482; June 21, 1968, 1,768,704; Feb. 17, 1969, 1,907,909, 1,907,910, 1,907,911
Int. Cl. C07d 87/36
U.S. Cl. 260—294.3
34 Claims

ABSTRACT OF THE DISCLOSURE

Substituted cyclohexene bases having the formula:

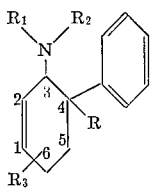

wherein R is CN, $COR_4$ or $COOR_4$; wherein $R_1$ is hydrogen or a straight or branched chain lower alkyl radical; wherein $R_2$ is a straight or branched chain lower alkyl radical or wherein the alkyl radicals represented by the symbols $R_1$ and $R_2$, taken together with the nitrogen atom to which they are attached, form a heterocyclic ring system; wherein $R_3$ is hydrogen or a straight or branched chain lower alkyl radical; and wherein $R_4$ is a straight or branched chain lower alkyl radical and medicinally acceptable acid addition salts thereof are disclosed. Disclosed also are cyclohexylamines derived from certain of the Formula I compounds; an amino alcohol derived from a cyclohexene of Formula I(a) and an amino alcohol derived from a cyclohexylamine of Formula II; and the acetylated derivative of the latter amino alcohol.

The compounds of the invention, i.e., the cyclohexenes of Formula I and the aforementioned derivatives thereof, exhibit analgesic activity in mammals and they are used as analgesics.

Disclosed also are processes for obtaining the Formula I compounds in the form of isomeric mixtures; methods for separating the cis- and trans-isomers from the isomeric mixtures, processes for obtaining the disclosed cyclohexylamines, amino alcohols and acetylated derivative; and a method for rearranging the cis-isomers of Formula I(a) to the trans-isomer.

CROSS REFERENCE TO RELATED APPLICATIONS

This application is a continuation-in-part of U.S. patent application Ser. No. 777,197, filed Nov. 19, 1968, now abandoned. The latter is a continuation-in-part of U.S. patent application Ser. No. 587,673, filed Oct. 19, 1966, now abandoned, and a continuation-in-part of U.S. patent application Ser. No. 690,794, filed Dec. 15, 1967, now abandoned, the said application Ser. No. 690,794, itself being a continuation-in-part of said application Ser. No. 587,673.

BRIEF SUMMARY OF THE INVENTION

Substituted cyclohexene bases having the formula:

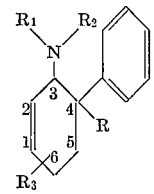

and medicinally acceptable acid addition salts thereof in which R is CN, $COR_4$ or $COOR_4$; in which $R_1$ is hydrogen or a straight or branched chain lower alkyl radical; in which $R_2$ is a straight or branched chain lower alkyl radical; or in which the alkyl radicals represented by the symbols $R_1$ and $R_2$, taken together with the nitrogen atom to which they are attached, form a heterocyclic ring system; in which $R_3$ is hydrogen or a straight or branched chain lower alkyl radical; and in which $R_4$ is a straight or branched chain lower alkyl radical are novel compounds and they have been found to possess analgesic activity.

The processes for preparing the compounds of Formula I, described herein, yield isomeric mixtures containing 3-cis-$R_1$-$R_2$-amino-4-phenyl-4-cis-R-$\Delta^1$-$R_3$-cyclohexene and 3-trans-$R_1$-$R_2$-amino-4-phenyl-4-trans-R-$\Delta^1$-$R_3$-cyclohexene. Processes for separating the individual isomers from the mixtures are disclosed and a rearrangement process whereby the cis-isomers of Formula I(a) are converted into the trans-isomers is also described.

In one preferred embodiment of the invention, cyclohexene bases having the formula:

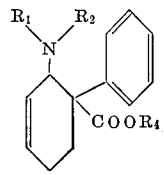

and medicinally acceptable salts thereof in which the symbols $R_1$, $R_2$ and $R_4$ have the same meaning as in Formula I are prepared.

In another embodiment of the invention, derivatives of the Formula I(a) compounds, namely cyclohexylamines having the formula:

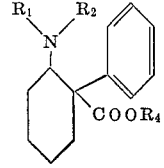

and medicinally acceptable acid addition salts are produced. The symbols $R_1$, $R_2$ and $R_4$ which appear in Formula II have the same meanings as in Formula I.

In a further embodiment of the invention, amino alcohols having the formulas:

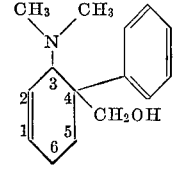

and

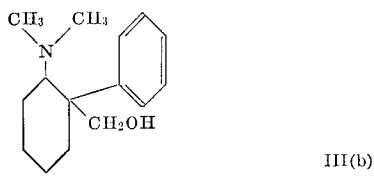

III(b)

and medicinally acceptable acid addition salts thereof, are produced. The compounds of Formulas III(a) and III(b) are prepared from the compounds of Formulas I(a) and II, respectively, wherein $R_1$ and $R_2$ are each methyl and $R_4$ is ethyl.

In still another embodiment of the invention, a compound having the formula:

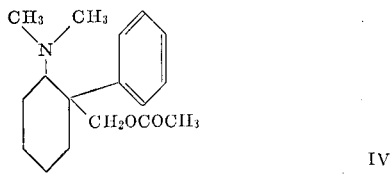

IV and medicinally acceptable acid addition salts thereof, is produced. The compound of Formula IV is obtained by the acetylation of the amino alcohol of Formula III(b).

Processes for preparing these compounds are described.

DETAILED DESCRIPTION

The therapeutically active substituted cyclohexene bases of this invention have the formula:

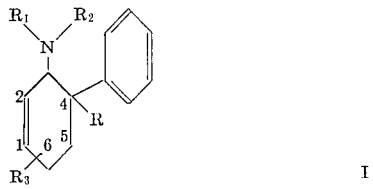

I

The invention includes also medicinally acceptable acid addition salts of the cyclohexene bases of Formula I. In Formula I, the symbol R represents CN, $COR_4$ or $COOR_4$ and the symbols $R_1$ and $R_2$ each represent straight or branched chain lower alkyl radicals, such as, methyl, ethyl, propyl, isopropyl, butyl, isobutyl, etc., groups. The lower alkyl radicals which are represented by the symbols $R_1$ and $R_2$ may be the same or different and such radicals, taken together with the nitrogen atom to which they are attached, can form a heterocyclic ring system, such as, pyrrolidinyl, morpholinyl or piperidinyl, etc. radicals. The symbol $R_3$ in Formula I represents hydrogen or a straight or branched chain lower alkyl radical, such as, methyl, ethyl, propyl, isopropyl, butyl, isobutyl, etc., groups. The symbol $R_4$ represents a straight or branched chain lower alkyl radical, such as, methyl, ethyl, propyl, isopropyl, butyl, isobutyl, etc., groups.

In one of its preferred embodiments, the invention encompasses compounds having the formula:

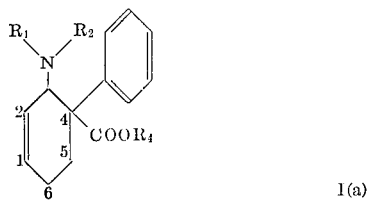

I(a)

and medicinally acceptable acid addition salts thereof, in which the symbols $R_1$, $R_2$ and $R_4$ have the same meanings as in Formula I.

As used throughout the present specification and claims, the expression "medicinally acceptable acid addition salts" denotes salts which are no more toxic than the cyclohexene bases from which they are obtained and which possess physical properties and characteristics which permit them to be formulated into dosage forms suitable for enteral or parenteral administration. In general, these salts are prepared by conventional methods. One such method involves reacting a stoichiometrically equivalent amount of cyclohexene base and acid in an inert common solvent. In producing the salts, any medicinally acceptable acid, either inorganic or organic in nature, can be employed. Such acids include, for example, hydrochloric acid, nitric acid, sulfuric acid, phosphoric acid, acetic acid, benzoic acid, citric acid, maleic acid, malic acid, salicyclic acid, tartaric acid, etc.

The compounds of Formulas I and I(a) are readily produced. One suitable method, which is disclosed in U.S. patent application Ser. No. 727,689, filed May 8, 1968, involves the steps of condensing, at a temperature of from about 3° C. to 5° C., a compound of the formula:

II with a compound of the formula:

$$CH_3CH{=}CHCHO \qquad III$$

in a ratio of two mols of Compound III for each mol of Compound II and subsequently reacting the reaction product thus obtained with a compound of the formula:

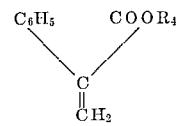

wherein $R_1$, $R_2$ and $R_4$ are as previously defined. Compounds of Formula I which are alkyl substituted in the cyclohexene ring are similarly prepared by condensing an amine of Formula II with an aldehyde of the formula $R_3CH_2CR_3{=}CR_3CHO$, e.g., trans-2-hexenal and tiglaldehyde, in the presence of a dehydrating agent and reacting the product thus obtained with an ester of the formula:

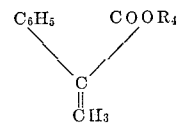

wherein $R_3$ and $R_4$ are as previously defined, with the proviso that at least one $R_3$ is a lower alkyl group.

The compounds of Formulas I and I(a), can be synthesized also by treating a compound of the formula:

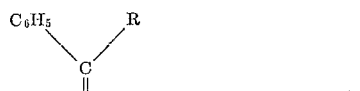

II with a compound of the formula:

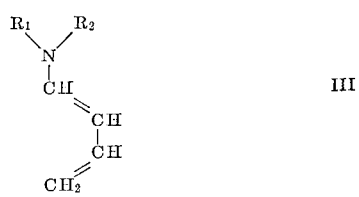

III wherein R, $R_1$ and $R_2$ are as previously defined. If desired, the reaction can be carried out with the reactants dissolved in an inert solvent, such as, benzene, toluene, ether, etc. However, the use of a solvent is not essential. In the process, the reactants are reacted in approximately equimolar proportions. The reaction may be effected at room temperature, for example, at a temperature of from about 20° C. to about 30° C. for a period of from about 18 to about 24 hours. Higher temperature, e.g., up to about 140° C. can be employed and, when so used, shorter heating periods may be possible. The reaction results in the production of a mixture which contains two isomeric compounds, namely, 3-cis-$R_1$-$R_2$- amino - 4 - phenyl - 4 - cis-R-Δ¹-R₃-cyclohexene and 3-trans-R₁-R₂-amino - 4 - phenyl - 4 - trans-R-Δ¹-R₃-cyclohexene.

The cis-isomers may be represented by the formula:

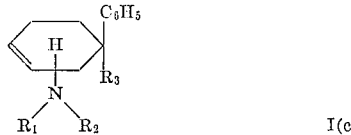

I(c)

and the trans-isomers may be represented by the formula:

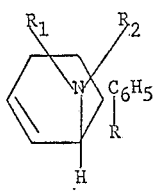

in which the symbols R, $R_1$ and $R_2$ have the same meaning as in Formula I.

The compounds of Formula I possess analgesic activity. However, the trans-isomers of the compounds of Formula I(a), more particularly, the compounds of Formula I(d), exhibit the most potent analgesic activity. In order to take advantage of their greater activity, the trans-isomers are preferably isolated from the cis-isomers prior to their use as analgesics. The compounds of Formulas II, III(a), III(b) and IV also exhibit analgesic activity.

The cis- and trans-isomers can be separated from the isomeric mixtures by any one of several novel procedures. One such procedure is as follows: the mixture containing the two isomers is converted into the corresponding hydrochloride by dissolving the reaction product in a suitable common solvent, such as, ether, and adding to the solution thus formed a sufficient quantity of an ethereal solution of hydrogen chloride to form the cis- and trans-hydrochloride salts. These two hydrochloride salts are then crystallized from a solvent mixture consisting of about 10 parts by volume of ethyl acetate to 1 part by volume of methyl ethyl ketone. Because the 1.5 hydrate of the cis-isomer is less soluble in ethyl acetate/methyl ethyl ketone, a sufficient quantity of water for the formation of a 1.5 hydrate of the cis-isomer is added to the ethyl acetate and methyl ethyl ketone solvent mixture. The cis-isomer readily precipitates out of solution in the form of its hydrate. The trans-isomer remaining in the solution can be recovered by removal of the solvent.

An alternate method of separating the cis- and trans-isomers from the reaction mixture is available. In this method, the isomeric cis-trans-base of the basic substituted cyclohexenes, prepared as previously described, is dissolved in a strong mineral acid, such as, hydrochloric acid, and the solution is adjusted to a pH of about 2.5 to about 3.5. To this acidic solution, an aqueous solution containing from about 15% to about 40% by weight, preferably about 20% by weight, of zinc chloride is gradually added until crystals of a zinc chloride complex begin to appear. If necessary, the solution may be seeded with zinc chloride complex crystals to initiate the crystallization. The zinc chloride reacts specifically and exclusively with the cis-isomer to form a complex of the zinc chloride and the cis-isomer which comes out of solution. The trans-isomer does not react with the zinc chloride and therefore remains dissolved in the acidic solution. Thus, by a simple filtration step, the insoluble complex of zinc chloride and the cis-isomer can be separated from the soluble trans-isomer. In the preferred embodiment, the isomeric mixture is dissolved in 1 N hydrochloric acid in such a quantity as to provide a solution made up of a ratio of from about 1.0 to about 2.3 liters of acid per mol of the isomeric mixture. A ratio of from about 0.8 mol to 1.0 mol, preferably 1.0 mol, of zinc chloride is used for each mol of the isomeric mixture present.

The pure cis-isomer is readily regenerated from the zinc complex. The process involves the first step of adding an organic solvent, such as, chloroform, methylene chloride or benzene containing 10% to 20% ethyl acetate, to the complex. The preferred solvent is chloroform. The complex is then treated with a sufficient quantity of a strong base, such as, concentrated ammonia, to obtain a pH of about 8.5 to about 9.5. The organic phase is thereafter separated and the pure cis-isomer is recovered therefrom by fractionation.

To obtain the pure trans-isomer from the acidic solution, an organic solvent, preferably chloroform, is added to the solution containing the isomer and the solution is made alkaline, preferably with concentrated aqueous ammonia. The pure trans-isomer is obtained from the alkaline mixture by dissolving the organic residue in a mixture of ethyl acetate and acetone with a concentrated solution of gaseous hydrochloric acid in ethylacetate being added to obtain a pH of about 3.5 to 4. The hydrochloric salt of the pure trans-isomer precipitates from the acidic solution and it is removed by filtration and recrystallized.

A third method is also available for isolating the trans-isomer from a reaction product which contains the mixture of the cis- and trans-isomers. This method is predicated on the finding that, when the reaction product comprising the isomeric mixture is dissolved in a lower molecular weight aliphatic, monohydroxy alcohol and treated with naphthalene-1,5-disulfonic acid, a double salt of the trans-isomer and the acid is selectively and exclusively formed. The double salt is extremely sparingly soluble and as a result it comes out of solution in practically quantitative amounts as a crystalline product substantially free of the cis-isomer and any other reaction products which may be present. In separating the isomers from the isomeric mixture by this method, an alcoholic solution of naphthalene-1,5-disulfonic acid is first prepared. In general, any lower molecular weight aliphatic, monohydroxy alcohol can be used in producing this solution. Thus, for example, methanol, ethanol, propanol, isopropanol, etc., are suitable for use. In the preferred embodiment of the invention, however, a solution of naphthalene-1,5-disulfonic acid in ethanol is employed. The concentration of acid in the alcohol solution is not particularly critical. A solution containing from about 10% to about 20% by weight of naphthalene-1,5-disulfonic acid is preferably employed. In the next step of the method, the isomeric mixture is similarly dissolved in an alcohol. In general, any lower molecular weight aliphatic monohydroxy alcohol, for example, methanol, ethanol, propanol, isopropanol, etc., is used as the solvent for the mixture. Preferably, however, a solution of the isomeric mixture in ethanol is employed. While the concentration of this solution is not particularly critical, it has been found that the best results are achieved when a sufficient quantity of the isomeric mixture is present to provide a solution which contains from about 15.0% to about 20.0% by weight of the desired trans-isomer. The quantity of the isomeric mixture needed to provide a given amount of the trans-isomer can be determined by preliminary experimentation. In the third step of the method, the alcoholic solution of the isomeric mixture and the alcoholic solution of the naphthalene-1,5-disulfonic acid are mixed together at room temperature. When the double salt commences to form, the reaction mixture is cooled to a temperature within the range of from about 0° C. to 5° C. and stirring is continued for a period of time sufficient to permit all of the trans-isomer to react with the acid. Generally, continuous stirring of the reaction mixture at a temperature of 0° C. to 5° C. for several hours will suffice. The crystallized double salt is thereafter recovered by filtration, washed with an alcohol, for example, ethanol, and dried. If desired, the product, i.e., the double salt of the trans-isomer, can be recrystallized from an alcohol, for example, ethanol. The double salt can be readily converted into the free base by slurrying it in water and treating the slurry with sodium hydroxide or some other suitable base. The trans-isomer, in the form of the free base, can, if desired, be converted into a medicinally acceptable acid addition salt by conventional methods.

The compounds of Formula I(a) constitute the preferred embodiment of the invention. Although the cis- and trans-isomers of the Formula I(a) compounds individually possess analgesic activity, the trans-isomers have somewhat greater analgesic activity than the corresponding cis-isomers. A further aspect of the present invention is the finding that the cis-isomer of Formula I(a) can be rearranged to form the pure trans-isomer thus making it possible to obtain an even larger amount of the pure trans-isomer. To accomplish this, the pure cis-base is heated for up to 3 hours at a temperature of from about 150° C. to about 160° C., preferably 155° C. in a nitrogen atmosphere in the presence of dicyclohexylamine, hydroquinone or α-naphthylamine. This reaction yields a mixture, 25% to 30% of which consists of the pure trans-isomer. When carrying out this rearrangement, it is essential to observe exactly the temperature ranges set forth herein. At temperatures lower than about 150° C. the rate of isomerization will decrease rapidly to very small values, while at temperatures above about 160° C. decomposition products will be formed from the thermally sensitive trans-compound.

As indicated heretofore, the invention embraces also cyclohexylamines having the formula:

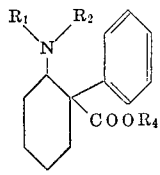

II in which $R_1$ is hydrogen or a straight or branched chain lower alkyl radical; wherein $R_2$ is a straight or branched chain lower alkyl radical or wherein the lower alkyl radicals which are represented by the symbols $R_1$ and $R_2$, which may be the same or different, taken together with the nitrogen atom to which they are attached, form a heterocyclic ring system; and wherein $R_4$ is a straight or branched chain lower alkyl radical and medicinally acceptable acid addition salts of such compounds. Included among the straight or branched chain lower alkyl radicals which are represented in Formula II by the symbols $R_1$, $R_2$ and $R_4$ are radicals, such as, methyl, ethyl, propyl, butyl, isobutyl, etc. The heterocyclic ring systems formed by $R_1$ and $R_2$ alkyl radicals, taken with the nitrogen atom to which they are attached include, for example, pyrrolidino, morpholino, piperidinyl, etc.

The compounds of Formula II are readily produced. In the preparative method, a compound having the formula:

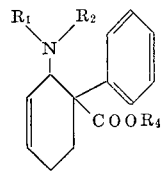

I(a)

wherein $R_1$, $R_2$ and $R_4$ are as previously defined is hydrogenated, in a suitable solvent, in the presence of a noble metal catalyst at a hydrogen pressure of from about 1 to about 80 atmospheres and at a temperature within the range of from about 20° C. to about 60° C. Various solvents are suitable for use in the process. Especially well suited for use, however, are solvents such as, ethanol, methanol, ethyl acetate, dioxane, tetrahydrofuran, glacial acetic acid, etc. In the preferred embmodiment of the invention, dioxane is employed. Furthermore, while other noble metal catalysts can be used, either platinum or platinum oxide is preferably employed. The cyclohexylamine bases produced by the aforesaid process can be converted into medicinally acceptable acid addition salts, if desired, by conventional methods.

The present invention embraces also amino alcohols having the formulas:

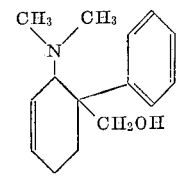

III(a)

and

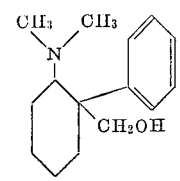

III(b)

and medicinally acceptable acid addition salts thereof.

The compounds of Formulas III(a) and III(b) are readily produced. In the case of the compound of Formula III(a), a compound having the formula:

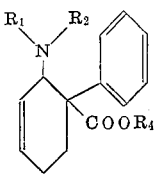

I(a)

in which $R_1$ and $R_2$ are methyl groups and $R_4$ is an ethyl radical is heated with lithium alumminum hydride in a dry ether, preferably diethyl ether, at a temperature within the range of from about 30° C. to about 50° C. for a period of about several hours. The reaction mixture, thus obtained, is thereafter treated with an aqueous alkaline solution, for example, aqueous sodium hydroxide solution.

The compound of Formula III(b) is produced by heating a compound having the formula:

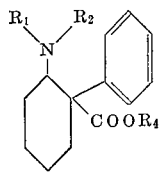

II in which $R_1$ and $R_2$ are methyl groups and $R_4$ is an ethyl radical with lithium aluminum hydride in a dry ether, preferably diethyl ether, at a temperature within the range of from about 30° C. to about 50° C. for a period of several hours. Subsequently, the reaction mixture is treated with an aqueous alkaline solution for example, aqueous sodium hydroxide solution.

In a still further embodiment, the invention embraces the compound having the formula:

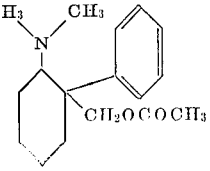

IV and medicinally acceptable acid addition salts thereof. This compound is obtained by reacting the amino alcohol of Formula III(b) with acetanhydride in the presence of pyridine.

The compounds of this invention, particularly those of Formula I(a), exhibit analgesic activity and they are used as analgesic agents. The compounds are unique in their relatively low toxicity. The compounds are further characterized in that their administration is not attended by adverse side effects. More specifically, upon administration, the comopunds do not produce paralyzing effects on the gastro-intestinal tract. Furthermore, administration of the compounds does not cause depression of the respiratory system. Side effects of such nature are commonly observed when narcotic analgesics, such as, meperidine, are administered. Additionally, the compounds of Formulas III(a), III(b) and IV have been found to exhibit spasmo analgesic activity in guinea pigs.

The manner in which the compounds of this invention are used as analgesic agents will be readily apparent to persons skilled in the art. In general, the active ingredient will be formulated into a composition which is suitable for enteral, for example, oral, or parenteral administration. In preparing such compositions there can be employed any of the various adjuvant or excipient materials customarily employed in the art. These adjuvants or excipients include, for example, inert substances such as water, gelatin, lactose, starches, magnesium stearate, talc, vegetable oils, gums, polyalkylene glycols, petroleum jellies, as well as many of the other compatible materials conventionally used in the preparation of medicaments. The compositions can be solid dosage forms for oral administration, for example, tablets, dragees, capsules, etc. Moreover, the compositions can be liquid dosage forms such as solutions, suspensions, emulsions, syrups, etc. If desired, the compositions can be sterilized and/or they can contain other additives such as preservatives, stabilizers, wetting agents, salts of varying osmotic pressure, buffers, etc. Conventional methods and techniques are employed in formulating all of the aforementioned dosage forms.

It has been found that the compounds of this invention are effective as analgesic agents when they are administered orally to mammals such as rats, rabbits, cats, dogs, etc., in a dosage of from about 10 mg./kg. to about 100 mg./kg., and more particularly in a dosage of from about 15 mg./kg. to about 75 mg./kg., of body weight. In the dog, a dosage of from about 20 mg./kg. to about 40 mg./kg. produced marked analgesia. It is to be understood that the foregoing dosage regimen is illustrative only and that such disclosure does not limit the scope or practice of the invention. In other mammalian species, smaller or larger dosages may be required to produce a desired degree of analgesia.

For a fuller understanding of the nature and objects of this invention, reference may be had to the following examples which are given merely as further illustrations of the invention and are not to be construed in a limiting sense.

EXAMPLE 1

Reaction of 1-(dimethylamino)-1,3-butadiene with atropic acid ethyl ester

A solution of 194 g. (2 mol) of fresh-distilled 1-(dimethylamino)-1,3-butadiene is combined at room temperature in a 1 liter round-bottom flask with 352 g. (2 mol) atropic acid ethyl ester. After being stirred for about 10 minutes, the reaction mixture gradually becomes exothermic. By cooling with ice water, the contents of the flask are kept at a temperature of 40° C. to 60° C. After the reaction has ceased, the mixture is kept overnight (about 8 to 24 hours) at room temperature. The next day the viscous product is dissolved in 10 liters of ether and precipitated with ethereal hydrogen chloride forming the corresponding hydrochloride. By fractional crystallization from ethyl acetate/methyl ethyl ketone (10:1), an almost complete separation of the isomeric cis/trans-isomers I(c) and I(d) is achieved. The separation can be carried out very easily due to the low solubility of the 1½-hydrate of I(c). Therefore, during the crystallization a sufficient quantity of water for the formation of the 1½-hydrate of I(c) is added to the mixture of solvents, whereby I(c) readily precipitates.

I(c)

4 - phenyl-3-cis-dimethylamino-4-cis-carbethoxy-$\Delta^1$-cyclohexene hydrochloride.

(Ethyl - cis-3-(dimethylamino)-4-phenyl-1-cyclohexene-4-carboxylate hydrochloride.)

M.P. 84° C. (the free base boils at 97.5°–98° C. at 0.01 mm. pressure).

Yield: 64.4%.

Analysis for $C_{17}H_{27}ClNO_{3.5}$.—Calc'd (percent): C, 60.61; H, 8.18; N, 4.16; Cl, 10.53. Found (percent): C, 60.85; H, 7.97; N, 4.44; Cl, 10.27.

I(d)

4 - phenyl - 3-trans-dimethylamino-4-trans-carbethoxy-$\Delta^1$-cyclohexene hydrochloride.

(Ethyl - trans - 3-(dimethylamino)-4-phenyl-1-cyclohexene-4-carboxylate hydrochloride.)

M.P. 159° C. (the free base boils at 95.5°–96° C. at 0.01 mm. pressure).

Yield: 22.2%.

Analysis for $C_{17}H_{24}ClNO_2$.—Calc'd (percent): C, 65.89; H, 7.81; N, 4.52; Cl, 11.45. Found (percent): C, 65.65; H, 7.65; N, 4.38; Cl, 11.52.

Total yield of analytically pure product I(c)/I(d)= 86.6% of theory.

EXAMPLE 2

Reaction of 1-(diethylamino)-1,3-butadiene with atropic acid ethyl ester

A solution of 250 g. (2 mol) of fresh-distilled 1-(diethylamino)-1,3-butadiene is treated with 352 g. (2 mol) of atropic acid ethyl ester as in Example 1 to obtain 4-phenyl - 3 - cis-diethylamino-4-cis-carbethoxy-$\Delta^1$-cyclohexene hydrochloride (ethyl - cis-3-(diethylamino)-4-phenyl-1-cylohexene-4-carboxylate hydrochloride), having a M.P. of 147° C. after being recrystallized from ethyl acetate/isopropanol Analysis for $C_{19}H_{28}ClNO_2$.—Calc'd (percent): C, 67.53; H, 8.34; N, 4.15; Cl, 10.50. Found (percent): C, 67.13; H, 8.15; N, 4.37; Cl, 10.52;

and the corresponding trans-isomer, 4-phenyl-3-trans-diethylamino - 4 - trans-carbethoxy-$\Delta^1$-cyclohexene hydrochloride (ethyl - trans-3-diethylamino-4-phenyl-1-cyclohexene-4-carboxylate hydrochloride).

EXAMPLE 3

Reaction of 1-piperidino-1,3-butadiene with atropic acid ethyl ester

A solution of 274 g. (2 mol) of 1-piperidino-1,3-butadiene is treated with 352 g. (2 mol) of atropic acid ethyl ester as in Example 1 to obtain 4-phenyl-3-cis-piperidino-4-cis-carbethoxy-$\Delta^1$-cyclohexene hydrochloride (ethyl-cis-3-piperidino-4-cyclohexene-4-carboxylate hydrochloride), M.P. 168° C. with decomposition after recrystallization from acetone

*Analysis* for $C_{20}H_{28}ClNO_2$.—Calc'd (percent): C, 68.65; H, 8.06; N, 4.00; Cl, 10.13. Found (percent): C, 68.60; H, 7.76; N, 4.10; Cl, 9.82;

and the corresponding trans-isomer, 4 - phenyl - 3 - trans-piperidino-4-trans-carbethoxy-$\Delta^1$-cyclohexene hydrochloride (ethyl-trans-3-piperidino4-phenyl - 1 - cyclohexene 4-carboxylate hydrochloride).

EXAMPLE 4

The pharmacological profile of 4-phenyl-3-trans-dimethylamino-4-trans-carbethoxy - $\Delta^1$ - cyclohexene hydrochloride (ethyl-trans (ethyl - trans - 3 - (dimethylamino)-4-phenyl-1-cyclohexene - 4 - carboxylate hydrochloride)-I(d)

(1) Acute toxicity.—The toxicity of the substance was first examined in male mice weighing between 18 to 22 g. The substance was administered to the animal in the stomch tube (i.g.) and subcutaneously (s.c.). A total of 360 mice were used for these tests. The 24 hour and 7 day values were determined respectively. For comparative purposes meperidine HCl was also tested. The following results were obtained:

| Substance | Administration | LD$_{50}$, 24 hours | Mg./kg., 7 days |
|---|---|---|---|
| I(d) | i.g. | 362 | 344 |
| Meperidine HCl | i.g. | 231 | 231 |
| I(d) | s.c. | 475 | 475 |
| Meperidine HCl | s.c. | 187 | 187 |

The toxicity was then determined in rats also by administering the substances i.g. and s.c. The test animals were male animals (Wistar) weighing 80 to 100 g. A total of 100 rats were used for the tests. The toxicity of meperidine HCl was also determined. The results obtained were the following:

| Substance | Administration | LD$_{50}$, 24 hours | Mg./kg., 7 days |
|---|---|---|---|
| I(d) | i.g. | 650 | 537 |
| Merperidine HCl | i.g. | 275 | 275 |
| I(d) | s.c. | 600 | 300 |
| Meperidine HCl | s.c. | 275 | 194 |

The third animal group which was used for toxicity tests were male guinea pigs weighing 240 to 370 g. The substance was administered i.g. and s.c. At the same time the toxicity of meperidine HCl was again determined. The following results were obtained:

| Substance | Administration | LD$_{50}$, 24 hours | Mg./kg., 7 days |
|---|---|---|---|
| I(d) | i.g. | 900 | 900 |
| Meperidine HCl | i.g. | 650 | 610 |
| I(d) | s.c. | 525 | 462 |
| Meperidine HCl | s.c. | 181 | 150 |

(2) Analgesic effect: (a) Phenyl-p-quinone method.—Male mice weighing between 18 to 22 g. in groups of 10 were used. Thirty minutes after the i.g. administration of the test substance and/or the control solution to be investigated, a 0.02% by weight of phenyl-p-quinone was administered to these animals interaperitoneally (i.p.) at a dose of 0.25 ml./20 g. of body weight. The observation period was 20 minutes after phenyl-p-quinone had been administered. The suppression and/or the reduction of the number of pain reactions for each group were considered the analgesic effects. The results of these tests are summarized as follows:

| Premedication | Administration | Number of animals | Number of animals with positive pain reactions |
|---|---|---|---|
| NaCl-solution | i.g. | 12 | 12 |
| I(d) 25 mg./kg. | i.g. | 12 | 7 |
| Meperidine HCl 15 mg./kg. | i.g. | 12 | 10 |
| Meperidine HCl 25 mg./kg. | i.g. | 12 | 7 |
| I(d) 30 mg./kg. | i.g. | 12 | 3 |
| Meperidine HCl 30 mg./kg. | i.g. | 12 | 5 |
| I(d) 35 mg./kg. | i.g. | 12 | 1 |
| Meperidine HCl 35 mg./kg. | i.g. | 12 | 3 |
| I(d) 40 mg./kg. | i.g. | 12 | 0 |

From these results, it can be concluded that I(d) is a superior analgesic over Meperdine HCl.

(3) Effect of respiration.—Analgesics of the type of morphine, especially meperidine, possess an undersirable effect on respiration.

In tests using mice as the host, Compound I(d) administered at a dose of 5 mg./kg. does not produce respiratory depression but it produces a stimulant effect. In contrast, meperidine hydrochloride at a similar dose produces a marked respiratory depression.

(4) Effect of the involuntary muscles.—It is known that certain analgesics such as morphine and meperidine have a paralyzing effect on the involuntary muscles such as the gastro-intestinal tract.

Compound I(d) in contrast does not produce such an inhibitory effect. This may be demonstrated by observing the contractions of a piece of an isolated guinea pig small intestine which is bathed in a solution containing I(d) or meperidine. The contractions of the gut bathed in 0.2% w./v. solution of meperidine HCl are inhibited, whereas that bathed in 0.2% w./v. of I(d) are not inhibited.

EXAMPLE 5

This example is included to demonstrate the manner in which 4-phenyl-3-trans-dimethylamino-4 - trans - carbethoxy-$\Delta^1$-cyclohexene is recovered from a mixture containing that compound and the corresponding cis-isomer by the selective formation of an insoluble zinc chloride complex of the cis-isomer.

In a 250 liter stainless steel vessel 12.0 kg. (44 mol) of a mixed isomeric base of 4-phenyl-3-cis-dimethylmino-4-cis-carbethoxy-$\Delta^1$-cyclohexene and 4-phenyl-3-trans-dimethylamino - 4 - trans-carbethoxy-$\Delta^1$-cyclohexene is dissolved in 50 liters of 1 N HCl; the solution is then diluted up to 70 liters and brought to a pH of 2.5 to 3.5. With agitation 25 liters of a solution of 6 kg. ZnCl$_2$ in 30 liters of water is gradually added. The solution is then seeded with crystals of the zinc complex. As soon as crystallization begins, the remainder of the zinc chloride solution is added. The mixture is agitated for at least one hour at room temperature and for one hour at 0° C. It is then filtered under strong pressure. The zinc chloride complex of 4 - phenyl-3-cis-dimethylamino-4-cis-carbethoxy-$\Delta^1$-cyclohexene weighs 10.6 kg. after air drying (damp weight 16 kg.).

The zinc chloride complex of the cis-isomer, having the empirical formula $C_{34}H_{48}Cl_4N_2O_4Zn$ and a molecular weight of 755.3, melted at 146° C. to 147° C.

*Analysis.*—Calc'd (percent) C, 54.06; H, 6.41; Cl, 18.79; N, 3.74; Zn, 8.68. Found (percent) C, 53.90; H, 6.11; Cl, 18.31; N, 3.98; Zn, 8.57.

The aqueous filtrate, obtained as described heretofore, is then poured with agitation into a mixture of 15 liters concentrated aqueous NH$_3$ (25–27%) and 5 liters of water, 25 liters of chloroform is added and the solution is thoroughly mixed. The chloroform phase is washed twice with water in a 50 liter separatory funnel and dried with K$_2$CO$_3$. After filtration, the chloroform is distilled off and the residue dissolved in a mixture of 8 liters ethyl acetate and 1 liter of acetone and then brought to a pH of 3.5 to 4 with a 4 molar solution of gaseous HCl in ethyl acetate. After a short time, the precipitation of 4-phenyl-3 - trans - dimethylamino-4-trans-carbethoxy-$\Delta^1$-cyclohexene commences. This is allowed to stand until the mixture reaches room temperature, crystals filtered off and then recrystallized from 35–40 liters of toluene.

Yield: 2.6 kg. 4-phenyl-3-trans-dimethylamino-4-trans-carbethoxy-$\Delta^1$-cyclohexene.

M.P. 152°–153° C.

EXAMPLE 6

This example is included herein to demonstrate the method of rearranging the cis-isomer to the more active trans-isomer.

25 g. of dicyclohexylamine are added to 5 kg. of 4-phenyl - 3 - cis - dimethylamino-5-cis-carbethoxy-$\Delta^1$-cyclohexene; after the reaction flask has been filled with nitrogen, the contents of the flask is heated for 3 hours up to 155° C. The reaction product is cooled and poured into 24 liters of 2 N HCl, while stirring. By means of extraction with benzol the neutral products are removed. Then the isomers are separated as described in Example 5.

Yield: 4-phenyl-3-trans-dimethylamino-4-trans-carbethoxy-$\Delta^1$-cyclohexene. HCl: 1 kg. (average value).

M.P. 152°–153° C.

EXAMPLE 7

This example is included herein to demonstrate an alternate method for isolating 4-phenyl-3-trans-dimethylamino-4-trans-carbethoxy-$\Delta^1$-cyclohexene from a product which contains that compound in admixture with 4-phenyl-3-cis-dimethylamino-4-cis-carbethoxy-$\Delta^1$-cyclohexene.

In this example, a solution of 432 grams (1.5 mol) of naphthalene-1,5-disulfonic acid in 3 liters of ethanol is first prepared. The isomeric mixture is dissolved in 3 liters of ethanol. A sufficient quantity of the isomeric mixture is used to provide 546 grams (2.0 mols) of 4-phenyl-3-trans-dimethylamino - 4 - trans-carbethoxy-$\Delta^1$-cyclohexene. The ethanolic solution of the isomeric mixture is treated with the ethanolic solution of naphthalene-1,5-disulfonic acid at room temperature. When the salt commences to precipitate out, the reaction mixture is cooled with stirring to a temperature within the range of 0° C. to 5° C. and it is maintained at such temperature until precipitation has ceased. The precipitate is recovered by filtration, washed with ethanol and air dried.

The product thus obtained is a relatively insoluble double salt of 4-phenyl-3-trans-dimethylamino-4-trans-carbethoxy-$\Delta^1$-cyclohexene and naphthalene - 1,5 - disulfonic acid. The double salt, which has the empirical formula $C_{44}H_{54}N_2O_{10}S_2$ melts, with decomposition, at 244° C. to 245° C.; molecular weight 834.84.

*Analysis.*—Calc'd (percent): C, 63.30; H, 6.52; N, 3.38; S, 7.68. Found (percent): C, 62.94; H, 6.24; N, 3.32; S, 7.43.

By slurrying the double salt in water and treating it with 2 N sodium hydroxide, 4-phenyl-3-trans-dimethylamino-4-trans-carbethoxy-$\Delta^1$-cyclohexene free base is obtained.

EXAMPLE 8

(A) In this example, 174 grams (1.77 mol) of trans-2-hexenal, 122.5 grams (0.89 mol) of anhydrous potassium carbonate, 420 mg. of phenanthrenequinone and 90 ml. of benzene were charged into a suitable reaction vessel and the mixture was cooled to a temperature within the range of from about 3° C. to 5° C. Thereafter, 39.9 grams (0.89 mol) of anhydrous dimethylamine was introduced into the mixture over a period of about 45 minutes. When the addition of the amine was completed, 166 grams (0.8 mol) of ethyl atropate was added. The reaction mixture was then heated to a temperature of from about 90° C. to 95° C. and it was maintained at that temperature for a period of about 2 hours.

The reaction mixture, obtained as described in the preceding paragraph, was then poured into 900 ml. of water and extracted with 450 ml. of benzene. The separated benzene extract was extracted two times using, first, 1085 ml. and, second, 210 ml. of 1 N hydrochloric acid. The aqueous extracts were combined and washed with 350 ml. of benzene. The aqueous acid was then basified with 50% aqueous sodium hydroxide and extracted with 525 ml. and 280 ml. portions of petroleum ether.

The ether extracts were combined and washed, using vigorous agitation for 75 minutes, with 1350 ml. of aqueous sodium bisulfite solution. The ether was separated and washed twice with water, using 280 ml. portions each time. The ether was separated and dried over magnesium sulfate and filtered. The filtrate was concentrated until 112.5 grams of residue remained. By gas liquid chromatography it was determined that the residue contained 32.4% of 4-phenyl-3-trans-dimethylamino-4-trans-carbethoxy-6-ethyl-$\Delta^1$-cyclohexene (or ethyl trans-2-(dimethylamino)-5-ethyl-1-phenyl - 3 - cyclohexene-1-carboxylate) and 66.5% of 4-phenyl-3-cis-dimethylamino-4-cis-carbethoxy-6-ethyl-$\Delta^1$-cyclohexene (or ethyl cis-2-(dimethylamino)-5-ethyl-1-phenyl-3-cyclohexene-1-carboxylate).

(B) The cis- and trans-isomer components of the reaction mixture were separated from each other in the following manner: 34.2 grams of the isomeric mixture, obtained as described in section (A) of this example, containing 11.1 grams (0.037 mol) of the trans-base, were dissolved in 130 ml. of isopropanol. This solution was treated with a solution of 7.5 grams (0.0204 mol) of naphthalene-1,5-disulfonic acid 4⅓ $H_2O$ in 45 ml. of isopropanol at a temperature of about 60° C. The resulting salt of naphthalene-1,5-disulfonic acid and 4-phenyl-3-trans - dimethylamino-4-transcarbethoxy-6-ethyl-$\Delta^1$-cyclohexene (or ethyl trans-2-(dimethylamino)-5-ethyl-1-phenyl-3-cyclohexene-1-carboxylate naphthalene sulfonate salt) was removed by filtration.

The filtrate from the foregoing step was concentrated to a residue and the essentially pure cis-isomer was decanted. This was dissolved in ether and washed with water. The ether was dried over magnesium sulfate, filtered and concentrated to a residue weighing 18.0 grams. The residue was then dissolved in anhydrous ether and treated with anhydrous hydrogen chloride. The resulting precipitate was collected and recrystallized from acetonitrile to yield 13.4 grams of 4-phenyl-3-cis-dimethylamino-4-cis-carbethoxy-6-ethyl-$\Delta^1$-cyclohexene hydrochloride (or ethyl cis-2-(dimethylamino)-5-ethyl - 1 - phenyl-3-cyclohexene-1-carboxylate hydrochloride), melting point 157° C. to 159° C. Thin layer chromatography indicated the presence of less than 0.2% of the trans-isomer.

(C) The isomeric mixture of section (A) of this example, 50 grams, was dissolved in 500 ml. of anhydrous ether and the solution was treated with anhydrous hydrogen chloride until precipitation was complete. The mixed cis- and trans-hydrochlorides were collected and dried to a weight of 54.0 grams, melting point 148° C. to 165° C. This mixture was dissolved in 120 ml. of hot dioxane and allowed to cool slowly to a temperature of 25° C. It was held at that temperature for a period of about 3 minutes. The precipitate of crude 4-phenyl-3-trans-dimethylamino-4-trans-carbethoxy-6-ethyl-$\Delta^1$-cyclohexene hydrochloride (or ethyl trans-2-(dimethylamino)-5-ethyl-1-phenyl-3-cyclohexene-1-carboxylate hydrochloride) was collected in a yield of 13.0 grams, melting point at 201° C. to 203° C. The salt was recrystallized from methyl ethyl ketone to yield 9.7 grams of the trans-hydrochloride, melting point 205.5° C. to 207° C. Gas liquid chromatography indicated the presence of less than 1% of the cis-isomer.

EXAMPLE 9

(A) In this example, 252.3 grams (3 mols) of tiglaldehyde, 207.3 grams (1.5 mol) of anhydrous potassium carbonate, 750 mg. of phenanthrenequinone and 150 ml. of benzene were charged into a reaction vessel and cooled to a temperature of from 3° C. to 5° C. Thereafter, 67.5 grams (1.5 mol) of anhydrous dimethylamine was introduced into the mixture over a period of about 75 minutes. When the addition of the amine was complete, 280 grams (1.35 mol) of ethyl atropate was added and the reaction mixture was introduced into a stainless steel autoclave (rocking) and maintained at a temperature of 150° C. to 160° C. for a period of 20 hours. At the end of that period of time, the mixture was poured into 1.5 liters of water and extracted with 750 ml. of benzene. The separated benzene extracts were then extracted two times, using 1.87 liters and 0.38 liter, respectively, of 1 N hydrochloric acid. The aqueous acid was basified with 50% aqueous sodium hydroxide and extracted with 900 ml. of petroleum ether.

The separated petroleum ether was subsequently agitated vigorously with 2.25 liters of 10% aqueous sodium bisulfite solution for a period of 75 minutes. The ether was separated, dried over magnesium sulfate and filtered. The filtrate was concentrated to a residue of 112.0 grams. The residue was further concentrated, by distillation, to a weight of 91.0 grams. The residue, containing a mixture of the cis- and trans-isomers, had a boiling point of 98° C. to 102° C./0.05 mm.

(B) The residue, obtained as described in section (A) of this example, 91.0 grams (0.32 mol) was dissolved in 90 ml. of ethyl acetate. To the solution thus obtained there was added 11.6 grams (0.32 mol) of hydrogen chloride in 230 ml. of ethyl acetate. The resulting product comprising the mixture of cis- and trans-isomers, in the form of their hydrochloride salts, was collected and dried to a weight of 87.0 grams; melting point 157° C. to 160° C.

69.0 grams of the mixture of the hydrochloride salts of the cis- and trans-isomers were stirred with 70 ml. of 1 N hydrochloric acid for a period of about 5 minutes. At the end of that time, the resulting cis-hydrochloride hydrate was collected by filtration and dried to a weight of 24.0 grams; melting point 45° C. to 55° C. The filtrate, which contained the trans-isomer in the form of its hydrochloride salt, was recovered and retained for subsequent isolation of that salt.

The cis-hydrochloride hydrate, obtained as described in the preceding paragraph, was suspended in 300 ml. of xylene and heated to reflux temperature. Water of hydration was removed by means of a separator. Hydrogen chloride was also lost by this procedure. The xylene was concentrated to an oil which was dissolved in ether and treated with anhydrous hydrogen chloride until precipitation was complete. The precipitate, comprising the crude hydrochloride salt of the cis-isomer, was collected and dried to a weight of 17.3 grams; melting point 175.5° C. to 179° C. The crude product was recrystallized from methyl ethyl ketone to yield 9.8 grams of 2-methyl-4-phenyl-3-cis-dimethylamino-4 - cis-carbethoxy - $\Delta^1$ - cyclohexene hydrochloride (or ethyl-cis-2-(dimethylamino)-3-methyl-1-phenyl-3-cyclohexene-1-carboxylate hydrochloride); melting at 185° C. to 187° C. Thin layer chromatography indicated the presence of 0.5% of the trans-isomer in the product.

The 1 N hydrochloric acid filtrate, i.e., the filtrate mentioned heretofore obtained when the cis-hydrochloride hydrate was isolated, was basified with 50% aqueous sodium hydroxide. The resulting base was extracted with ether, separated and dried over magnesium sulfate. The drying agent was removed by filtration and the filtrate was concentrated to provide a residue of 42.0 gram weight. The residue (0.15 mol) was dissolved in 40 ml. of ethyl acetate and a solution of 5.33 grams (0.15 mol) of hydrogen chloride in 100 ml. of ethyl acetate was added thereto. The crude trans-isomer, in the form of its hydrochloride salt, thus obtained was collected and dried to a weight of 44.5 grams; melting point 162° C. to 175° C. Recrystallization from methyl ethyl ketone yielded 26.5 grams of 2-methyl-4-phenyl-3-trans-dimethylamino-4-trans-carbethoxy-$\Delta^1$-cyclohexene hydrochloride (or ethyl-trans-2-(dimethylamino)-3-methyl - 1 - phenyl - 3 - cyclohexene-1-carboxylate hydrochloride); melting point 184.5° C. to 186.5° C. Thin layer chromatography indicated the presence of 0.25% to 0.5% of the cis-isomer in the product.

EXAMPLE 10

In this example, 25.8 grams (0.2 mol) of atropanitrile and 19.4 grams (0.2 mol) of 1-(dimethylamino)-1,3-butadiene were charged, at room temperature, into a reaction vessel containing 100 cc. of benzene. An exothermic reaction commenced and, by cooling, the reacting mixture was maintained at a temperature below about 30° C. After the reaction had ceased, the organic phase of the reaction mixture was extracted with 2 N hydrochloric acid. The aqueous hydrochloric acid layer was adjusted to a pH 9.0 using 2 N sodium hydroxide. The oil which separated was then mixed with ether. The ethereal phase was distilled under low vacuum (102° C. to 104° C./0.01 torr). The distillate was dissolved in ethyl acetate and the solution, thus obtained, was treated with hydrogen chloride to precipitate a mixture containing the hydrochloride salt of 4-phenyl-3-cis-dimethylamino-4-cis-nitrilo-$\Delta^1$-cyclohexene and the hydrochloride salt of 4-phenyl-3-trans-dimethylamino-4-trans-nitrilo-$\Delta^1$-cyclohexene. The precipitate was recovered by filtration and it was then dissolved in a small amount of boiling isopropyl alcohol. Upon cooling, a precipitate consisting predominantly of the hydrochloride salt of the cis-isomer was obtained. The precipitate was recovered by filtration, dissolved in boiling isopropyl alcohol and cooled. The cis-isomer, in a pure form, was obtained as a precipitate.

The isopropyl alcohol phases were combined with the ethyl acetate phase which was used in the initial precipitation of the hydrochloride salts and the combination was extracted with hot acetone. The hydrochloride salt of 4-phenyl-3-trans-dimethylamino-4-trans-nitrilo-$\Delta^1$ - cyclohexene accumulated in the acetone phase. The acetone phase was separated and the hydrochloride salt of the trans-isomer was obtained by evaporation of the solvent. The hydrochloride salt was subsequently converted into the oxalate salt by conventional methods and, by recrystallization from 95% acetone, a pure oxalic salt of 4-phenyl-3-trans-dimethylamino-4-trans-nitrilo-$\Delta^1$-cyclohexene was obtained. The oxalate salt was subsequently converted into the hydrochloride salt.

By this procedure, there was obtained 42 grams of pure 4-phenyl-3-cis-dimethylamino-4-cis-nitrilo-$\Delta^1$-cyclohexene hydrochloride, melting point 184° C. to 186° C. (isopropanol).

Analysis for $C_{15}H_{29}ClN$ (262.8).—Calc'd (percent): C, 68.56; H, 7.27; N, 10.66; Cl, 13.44. Found (percent): C, 68.35; H, 7.08; N, 10.89; Cl, 13.47;

and 7.5 grams of 4-phenyl-3-trans-dimethylamino-4-trans-nitrilo-$\Delta^1$-cyclohexene hydrochloride, melting point 180° C. to 183° C. (dioxane).

Analysis for $C_{15}H_{29}ClN$ (262.8).—Calc'd (percent): C, 68.56; H, 7.28; N, 10.66; Cl, 13.49. Found (percent): C, 68.80; H, 7.34; N, 10.52; Cl, 13.56.

EXAMPLE 11

In this example, a mixture of 4-phenyl-3-cis-dimethylamino-4-cis-carbomethoxy-$\Delta^1$-cyclohexene and 4 - phenyl-3-trans-dimethylamino - 4 - trans-carbomethoxy-$\Delta^1$-cyclohexene was obtained by reacting the methyl ester of atropic acid with 1-(dimethylamino)-1,3-butadiene while dissolved in xylene. The reaction was carried out as described in Example 10, except that the mixture was refluxed at a temperature of 140° C. for a period of about 15 minutes to bring the reaction to completion. The isomers were separated by the treatment of the isomeric mixture with naphthalene-1,5-disulfonic acid salts in ispropanol. The naphthalene-1,5-disulfonic acid salt of 4-phenyl-3-trans-dimethylamino-4-trans-carbomethoxy - $\Delta^1$ - cyclohexene separated from the solution in the form of a precipitate. This salt was recovered, by filtration, in practically quantitative yields. The naphthalene-1,5-disulfonic acid salt of 4-phenyl-3-cis-dimethylamino - 4 - cis - carbomethoxy-$\Delta^1$-cyclohexene was subsequently obtained by evaporation of the mother liquors. These salts were, thereafter, converted separately into the corresponding hydrochloric acid salts by conventional methods.

There was, thus obtained, 16.4 grams of 4-phenyl-3-cis-dimethylamino - 4 - cis-carbomethoxy-$\Delta^1$-cyclohexene hydrochloride, melting point 156° C. to 157° C. (ethyl acetate).

Analysis for $C_{16}H_{22}ClNO_2$ (295.8).— Calc'd (percent): C, 64.97; H, 7.50; N, 4.73; Cl, 11.99. Found (percent): C, 64.98; H, 7.64; N, 4.86; Cl, 11.76;

and 6.5 grams of 4-phenyl-3-trans-dimethylamino-4-trans-carbomethoxy - $\Delta^1$ - cyclohexene hydrochloride, melting point 168° C. to 169° C. (ethyl acetate).

Analysis for $C_{16}H_{22}ClNO_2$ (295.8).—Calc'd (percent): C, 64.97; H, 7.50; N, 4.73; Cl, 11.99. Found (percent): C, 64.82; H, 7.43; N, 4.52; Cl, 11.86.

The analgesic activity of 4-phenyl-3-trans-dimethylamino-4-trans-carbomethoxy - $\Delta^1$ - cyclohexene was evaluated by the phenyl-p-quinone method described heretofore. Tested in twelve animals (mice) and administered subcutaneously, the compound had an $ED_{50}$ of 75 mg./kg. of body weight. The compound, administered subcutaneously to mice, had an $LD_{50}$ of 300 mg./kg. of body weight.

EXAMPLE 12

In this example, the ethyl ester of atropic acid was mixed with 1-N-pyrrolidino-1,3-butadiene in the absence of a solvent. The mixture was distilled under low vacuum (boiling point 116° C, to 119° C./0.01 torr). A mixture comprising 4-phenyl-3-cis - N - pyrrolidino - 4 - cis-carbethoxy-$\Delta^1$-cyclohexene and 4 phenyl-3-trans-N-pyrrolidino-4-trans-carbethoxy-$\Delta^1$-cyclohexene was obtained. The isomers were separated by column chromatography on acidic $Al_2O_3$-Woelm, using benzene and ethanol in a ratio of 20:1. The hydrochloride salts of 4-phenyl-3-cis-N-pyrrolidino-4-cis-carbethoxy - $\Delta^1$ - cyclohexene and 4-phenyl-3-trans-N-pyrrolidino-4-trans - carbethoxy - $\Delta^1$ - cyclohexene were precipitated in ethyl acetate, as described in Example 10, and the hydrochloride salts were subsequently purified by fractional crystallization from dioxane.

There was thus obtained, 20.8 grams of 4-phenyl-3-cis-N-pyrrolidino - 4 - cis-carbethoxy - $\Delta^1$ - cyclohexene hydrochloride, melting point 170° C. to 172° C. (dioxane).

Analysis for $C_{19}H_{26}ClNO_2$ (335.9).— Calc'd (percent): C, 67.94; H, 7.80; N, 4.17; Cl, 10.55. Found (percent): C, 67.70; H, 7.67; N, 4.18; Cl, 10.16;

and 10.4 grams of 4-phenyl-3-trans - N - pyrrolidino-4-trans-carbethoxy-$\Delta^1$-cyclohexene hydrochloride, melting point 177°–179° C. (dioxane).

Analysis for $C_{19}H_{26}ClNO_2$ (335.9).—Calc'd (percent): C, 67.94; H, 7.80; N, 4.17; Cl, 10.55. Found (percent): C, 67.74; H, 7.90; N, 4.06; Cl, 10.21.

EXAMPLE 13

In this example, the isopropyl ester of atropic acid and 1-(dimethylamino)-1,3-butadiene were reacted as described in Example 10, except, however, no solvent was employed. There was thus obtained, a mixture containing a predominant amount of 4-phenyl - 3 - cis-dimethylamino-4-cis-carbisopropoxy - $\Delta^1$ - cyclohexene. The cis-base was converted into the hydrochloric acid salt by conventional procedures. The trans-isomer was not isolated.

The hydrochloride salt of the cis-isomer had a melting point of 86° C. (1.25 $H_2O$).

Analysis for $C_{18}H_{28.5}ClNO_{2.25}$ (346.4).—Calc'd (percent): C, 62.39; H, 8.29; N, 4.05; Cl, 10.24. Found (percent): C, 62.21; H, 8.28; N, 4.14; Cl, 10.14.

EXAMPLE 14

In this example, α-acetylstyrene and 1-(dimethylamino)-1,3-butadiene were reacted in benzene in the manner described in Example 10.

There was, thus obtained, a mixture of 4-phenyl-3-cis-dimethylamino-4-cis-acetyl-$\Delta^1$-cyclohexene and 4 - phenyl-3-trans-dimethylamino - 4 - trans-acetyl-$\Delta^1$-cyclohexene. The trans-isomer was not isolated. The cis-isomer was isolated in the form of its hydrochloride salt, melting point 146° C. to 148° C. (ethyl acetate/isopropanol 10:1).

Analysis for $C_{16}H_{22}ClNO$ (279.8).—Calc'd (percent): C, 68.68; H, 7.93; N, 5.00; Cl, 12.67. Found (percent): C, 68.53; H, 7.80; N, 4.98; Cl, 12.84.

EXAMPLE 15

In this example, the ethyl ester of atropic acid was reacted, as described in Example 10, in benzene with 1-(monomethylamino)-1,3-butadiene.

There was thus obtained, a mixture of 4-phenyl-3-cis-monomethylamino - 4 - cis-carbethoxy-$\Delta^1$-cyclohexene and 4-phenyl-3-trans-monomethylamino - 4 - trans-carbethoxy-$\Delta^1$-cyclohexene. The trans-isomer was not isolated. The cis-isomer was isolated as the hydrochloride, melting point 222° C. to 223° C. (isopropanol/ethanol 10:1).

Analysis for $C_{16}H_{22}ClNO_2$ (295.9).—Calc'd (percent): C, 64.94; H, 7.50; N, 4.73; Cl, 11.98. Found (percent): C, 65.15; H, 7.50; N, 4.75; Cl, 11.84.

EXAMPLE 16

In this example, 13.7 grams (0.05 mol) of 4-phenyl-3-cis-dimethylamino-4-cis-carbethoxy-$\Delta^1$-cyclohexene, produced as described in Example 1, were dissolved in 100 cc. of dioxane and the cyclohexene compound was hydrogenated therein under a hydrozen pressure of one atmosphere in the presence of 0.2 gram of platinum oxide and at a temperature of about 20° C. The theoretical amount of hydrogen was taken up in about one hour. The catalyst was, thereafter, removed by filtration and the filtrate was concentrated. The residue was extracted with ether. The ether phase was washed and dried and distilled under low vacuum.

2-phenyl-2-cis-carbethoxy-cis-N,N-dimethyl cyclohexylamine was precipitated in crystalline form as the hydrochloride salt from ethyl acetate. Melting point 127° C. (as the semihydrate from methyl ethyl ketone).

Analysis for $C_{17}H_{27}ClNO_{2.5}$ (320.9).—Calc'd (percent): C, 63.62; H, 8.48; N, 4.36; Cl, 11.05. Found (percent): C, 63.78; H, 8.46; N, 4.43; Cl, 10.71.

The analgesic activity of the hydrochloride salt of 2-phenyl-2-cis-carbethoxy-cis - N,N - dimethyl cyclohexylamine was evaluated by the phenyl-p-quinone method. The results are summarized in the following table:

| Premedication | Number of test animals (mice) | Number of animals with positive pain reaction |
|---|---|---|
| Control | 12 | 12 |
| Hydrochloric salt of cis-isomer | 12 | 6 |

The control was tragacanth mucilage and the cis-isomer hydrochloride was administered subcutaneously at a dosage of 25 mg./kg. of body weight.

The cis-isomer hydrochloride administered subcutaneously to mice, had an $LD_{50}$ of 125 mg./kg.

EXAMPLE 17

In this example, 13.7 grams (0.05 mol) of 4-phenyl-3-trans - dimethylamino - 4 - trans - carbethoxy - $\Delta^1$ - cyclohexene, produced as described in Example 1, was added to and dissolved in 200 cc. of dioxane. The cyclohexene compound, while dissolved in dioxane, was hydrogenated under a hydrogen pressure of 80 atmospheres at a temperatuer of about 60° C. and in the presence of about 0.5 gram of platinum oxide. The reaction product, thus obtained, was processed in the manner described in Example 16. There was, thus obtained, precipitated from ethyl acetate, the hydrochloride salt of 2-phenyl-2-trans-carbethoxy-trans-N,N-dimethyl cyclohexylamine, melting point 188.9° C. from methyl ethyl ketone/ethyl acetate (1:1).

Analysis for $C_{17}H_{20}ClNO_2$ (311.9).—Calc'd (percent): C, 65.47; H, 8.41; N, 4.49; Cl, 11.37. Found (percent): C, 65.62; H, 8.38; N, 4.61; Cl, 10.87.

EXAMPLE 18

In this example, 4-phenyl-3-cis-monomethylamino-4-cis-carbethoxy-$\Delta^1$-cylcohexene, produced as described in Example 15, was hydrogenated in the manner described in Example 16. Precipitation of the product, in the form of its hydrochloride salt, from methyl ethyl ketone yielded the crystalline 2-phenyl-2-cis-carbethoxy-cis-N-monomethyl cyclohexylamine hydrochloride, melting point 177° C.

Analysis for $C_{16}H_{24}ClNO_2$(297.8).—Calc'd (percent): C, 64.52; H, 8.13; N, 4.70; Cl, 11.91. Found (percent): C, 64.71; H, 8.11; N, 4.65; Cl, 11.59.

EXAMPLE 19

In this example, 4-phenyl-3-cis-dimethylamino-4-cis-carbomethoxy-$\Delta^1$-cyclohexene was hydrogenated by the procedure described in Example 16. Precipitation of the product, as its hydrochloride salt, from ethyl acetate/isopropanol yielded 2-phenyl-2-cis-carbomethoxy-cis-N,N-dimethyl cyclohexplamine hydrochloride, melting point 173° C. to 175° C.

Analysis for $C_{16}H_{24}ClNO_2$ (297.8).—Calc'd (percent): C, 64.52; H, 8.13; N, 4.70; Cl, 11.91. Found (percent): C, 64.74; H, 7.92; N, 4.62; Cl, 11.98.

EXAMPLE 20

In this example, 4 - phenyl-3-trans-dimethylamino-4-trans - carbomethoxy - $\Delta^1$ - cyclohexene, produced as described in Example 11, was hydrogenated in the manner described in Example 17. The hydrochloride salt of 2-phenyl-2-trans-carbomethoxy-trans-N,N - dimethyl cyclohexylamine was precipitated in crystalline form from isopropanol, melting point 184° C. to 185° C.

Analysis for $C_{16}H_{24}ClNO_2$ (297.8).—Calc'd (percent): C, 64.52; H, 8.13; N, 4.70; Cl, 11.91. Found (percent): C, 64.54; H, 7.99; N, 4.83; Cl, 11.94.

EXAMPLE 21

In this example, 2-phenyl-2-cis-carbethoxy-cis-N,N-diethyl cyclohexylamine was obtained by the hydrogenation of 4-phenyl-3-cis-diethylamino-4-cis-carbethoxy-$\Delta^1$-cyclohexene. The latter compound was produced as described in Example 2. The hydrogenation was carried out in the manner described in Example 16. The hydrochloride salt of 2-phenyl-2-cis-carbethoxy-cis-N,N-diethyl cyclohexylamine was precipitated from methyl ethyl ketone in crystalline form, melting point 171° C.

Analysis for $C_{19}H_{30}ClNO_2$ (339.9).—Calc'd (percent): C, 67.13; H, 8.89; N, 4.12; Cl, 10.43. Found (percent): C, 67.04; H, 8.80; N, 4.27; Cl, 10.20.

EXAMPLE 22

In this example, 2-phenyl-2-cis-carbethoxy-cis-N,N-pentamethylene cyclohexylamine was obtained by the hydrogenation of 4-phenyl-3-cis-piperidino-4-cis-carbethoxy-$\Delta^1$-cyclohexene. The latter was produced as described in Example 3. The hydrogenation was carried out in the manner described in Example 16. The hydrochloride salt of 2-phenyl-2-cis-carbethoxy-cis-N,N-pentamethylene cyclohexylamine was precipitated from acetone in crystalline form, melting point 176° C.

Analysis for $C_{20}H_{30}ClNO_2$ (351.9).—Calc'd (percent): C, 68.25; H, 8.59; N, 3.99; Cl, 10.08. Found (percent): C, 68.22; H, 8.51; N, 4.00; Cl, 10.42.

EXAMPLE 23

In this example, 54.6 grams (0.2 mol) of 4-phenyl-3-cis-dimethylamino-4-cis-carbethoxy-$\Delta^1$-cyclohexene was added, in a dropwise fashion, to a suspension of 7.6 grams (0.2 mol) of lithium aluminum hydride in 150 cc. of dry diethyl ether. The reaction mixture was heated at reflux temperature for a period of about three hours. Thereafter, 150 cc. of 10% sodium hydroxide was added while the reaction mixture was cooled with ice water. Ethyl acetate and ethyl alcohol were thereafter added to the cooled reaction mixture, following which the organic layer was separated, dried and evaporated. The residue from the evaporation step was dissolved in isopropyl alcohol and gaseous hydrogen chloride was added to the solution.

There was, thus obtained, 4-phenyl-3-cis-dimethylamino- 4 - cis-hydroxymethyl-$\Delta^1$-cyclohexene hydrochloride, melting point 210° C. to 211° C. (isopropanol). $LD_{50}=250$ mg./kg., s.c. in mice.

Analysis for $C_{15}H_{22}ClNO$ (267.9).—Calc'd (percent): C, 67.25; H, 8.27; N, 5.23; Cl, 13.23. Found (percent): C, 67.75; H, 8.23; N, 5.38; Cl, 13.35.

EXAMPLE 24

In this example, 55 grams (0.2 mol) of 2-phenyl-2-cis-carbethoxy-cis - N,N - dimethyl cyclohexylamine, produced as described in Example 16, was added, in a dropwise fashion, to a suspension of 7.6 grams (0.2 mol) of lithium aluminum hydride in 150 cc. of dry diethyl ether. The reaction mixture was heated at reflux temperature for a period of about three hours. Thereafter, 150 cc. of 10% sodium hydroxide was added while the reaction mixture was being cooled with ice water. Ethyl acetate and ethyl alcohol were then added to the reaction mixture, following which the organic layer was separated, dried and evaporated. The residue which remained after the evaporation step was triturated with petroleum ether, and upon solidification, the product was recrystallized from petroleum ether.

There was, thus obtained, 2-phenyl-2-cis-hydroxymethyl-cis-N,N-dimethyl cyclohexylamine, melting point 54° C. to 55° C. (petroleum ether).

Analysis for $C_{15}H_{23}NO$ (233.3).—Calc'd (percent): C, 77.22; H, 9.93; N, 6.00. Found (percent): C, 77.41; H, 10.09; N, 6.16.

EXAMPLE 25

In this example, 25 grams (0.09 mol) of crude 2-phenyl-2-cis-hydroxymethyl-cis-N,N-dimethyl cyclohexylamine, produced as described in Example 24, was mixed with 50 cc. of acetic anhydride and, upon the addition of 1 cc. of pyridine, the mixture was heated at reflux temperature for a period of about five hours. At the end of that period of time, water was added and the thus obtained oil phase was taken up in ether/ethyl acetate 10:1. The organic phase was separated, washed and dried. The solvent was removed by distillation and the residue was dissolved in ethyl acetate. The solution was then treated with gaseous hydrogen chloride.

There was, thus obtained, 2-phenyl - 2 - cis - acetoxymethyl-cis-N,N-dimethyl cyclohexylamine hydrochloride, melting point 251° C. to 252° C. (90% acetone).

Analysis for $C_{17}H_{26}ClNO_2$ (311.9).—Calc'd (percent: C, 65.46; H, 8.40; N, 4.49; Cl, 11.36. Found (percent): C, 65.58; H, 8.50; N, 4.55; Cl, 11.44.

EXAMPLE 26

(A) The hydrochloride salt of 4-phenyl-3-cis-dimethylamino-4-cis-hydroxymethyl-$\Delta^1$-cyclohexene, produced as described in Example 23, was evaluated for its analgesic activity by the phenyl-p-quinone test method.

The compound was administered subcutaneously to the test animals (mice) at a dosage level of 75 mg./kg. of body weight. Tragacanth mucilage was administered to test animals (mice) as the control. The results of the test are summarized in the following table:

| Premedication | Number of test animals | Number of test animals with positive pain reaction |
| --- | --- | --- |
| Control | 12 | 12 |
| Hydrochloride salt of cis-isomer | 12 | 4 |

(B) The hydrochloride salt of the cis-isomer was subjected also to the spasmolysis test on the guinea-pig ileum. The following results demonstrate the spasmo analgesic activity of the compound in guinea-pigs:

Spasmogenic agent (dilution): Complete spasmolysis [1]
Acetyl choline ($4 \times 10^{-7}$) _____ $4 \times 10^{-5}$ (dilution)
Barium chloride ($8 \times 10^{-4}$) ____ $5 \times 10^{-6}$ (dilution)
Histamine ($4 \times 10^{-6}$) _____ $8 \times 10^{-5}$ (dilution)

[1] By 4 - phenyl-3-cis-dimethylamino-4-cis-hydroxymethyl-$\Delta^1$-cyclohexene hydrochloride.

Having described my invention, what I desire to secure by Letters Patent is:

1. A compound of the formula:

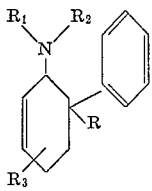

wherein R is CN, COR$_4$ or COOR$_4$; wherein R$_1$ is hydrogen or lower alkyl; wherein R$_2$ is lower alkyl; or wherein the lower alkyl groups represented by the symbols R$_1$ and R$_2$, taken together with the nitrogen atom to which they are attached, form a pyrrolidinyl, morpholinyl or piperidinyl radical; wherein R$_3$ is hydrogen or lower alkyl; and wherein R$_4$ is a lower alkyl or a salt thereof with a medicinally acceptable acid.

2. The compound of claim 1 which is 4-phenyl-3-cis-dimethylamino-4-cis-carbethoxy-6-ethyl-$\Delta^1$-cyclohexene or a salt thereof with a medicinally acceptable acid.

3. The compound of claim 1 which is 4-phenyl-3-trans-dimethylamino - 4 - trans - carbethoxy - 6 - ethyl-$\Delta^1$-cyclohexene or a salt thereof with a medicinally acceptable acid.

4. The compound of claim 1 which is 4 - phenyl - 2-methyl-3-cis-dimethylamino-4-cis-carbethoxy - $\Delta^1$ - cyclohexene or a salt thereof with a medicinally acceptable acid.

5. The compound of claim 1 which is 4 - phenyl - 2-methyl-3-trans-dimethylamino-4-trans - carbethoxy - $\Delta^1$-cyclohexene or a salt thereof with a medicinally acceptable acid.

6. The compound of claim 1 which is 4-phenyl-3-trans-dimethylamino-4-trans-nitrilo-$\Delta^1$-cyclohexene or a salt thereof with a medicinally acceptable acid.

7. The compound of claim 1 which is 4-phenyl-3-cis-dimethylamino-4-cis-acetyl - $\Delta^1$ - cyclohexene or a salt thereof with a medicinally acceptable acid.

8. A compound of the formula:

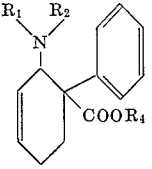

wherein R$_1$ is hydrogen or lower alkyl; wherein R$_2$ is lower alkyl; or wherein R$_1$ and R$_2$ taken together with the nitrogen atom to which they are attached form a pyrrolidino, morpholinyl or piperidinyl radical; and wherein R$_4$ is lower alkyl or a salt thereof with a medicinally acceptable acid.

9. The compound of claim 8 which is 3-cis-dimethylamino - 4 - phenyl - 4 - cis - carbethoxy - $\Delta^1$ - cyclohexene or a salt thereof with a medicinally a acceptable acid.

10. The compound of claim 8 which is 3-trans-dimethylamino - 4 - phenyl - 4 - trans - carbethoxy - $\Delta^1$-cyclohexene or a salt thereof with a medicinally acceptable acid.

11. The compound of claim 8 which is 3-cis-dimethylamino - 4 - phenyl - 4 - cis - carbethoxy - $\Delta^1$ - cyclohexane or a salt thereof with a medicinally acceptable acid.

12. The compound of claim 8 which is 3-trans-diethylamino - 4 - phenyl - 4 - trans - carbethoxy - $\Delta^1$-cyclohexene or a salt thereof with a medicinally acceptable acid.

13. The compound of claim 8 which is 3-cis-piperidino-4 - phenyl - 4 - cis - carbethoxy - $\Delta^1$ - cyclohexere or a salt thereof with a medicinally acceptable acid.

14. The compound of claim 8 which is 3-trans-piperidino - 4 - phenyl - 4 - trans - carbethoxy - $\Delta^1$ - cyclohexene or a salt thereof with a medicinally acceptable acid.

15. The compound of claim 8 which is 4-phenyl-3-trans-dimethylamino - 4 - trans - carbomethoxy - $\Delta^1$-cyclohexene or a salt thereof with a medicinally acceptable acid.

16. The compound of claim 8 which is 4-phenyl-3-trans - N - pyrrolidino - 4 - trans - carbethoxy - $\Delta^1$-cyclohexene or a salt thereof with a medicinally acceptable acid.

17. The compound of claim 8 which is 4-phenyl-3-cis-dimethylamino - 4 - cis - carbisopropoxy - $\Delta^1$ - cyclohexene or a salt thereof with a medicinally acceptable acid.

18. The compound of claim 8 which is 4-phenyl-3-cis-monomethylamino - 4 - cis - carbethoxy - $\Delta^1$ - cyclohexene or a salt thereof with a medicinally acceptable acid.

19. 2 - phenyl - 2 - cis - carbethoxy - cis - N - monomethyl cyclohexylamine or a salt thereof with a medicinally acceptable acid.

20. 2 - phenyl - 2 - cis - carbethoxy - cis - N,N - diethyl cyclohexylamine or a salt thereof with a medicinally acceptable acid.

21. 2 - phenyl - 2 - cis - carbethoxy - cis - N,N - pentamethylene cyclohexylamine or a salt thereof with a medicinally acceptable acid.

22. 4 - phenyl - 3 - cis - dimethylamino - 4 - cis - hydroxymethyl - $\Delta^1$ - cyclohexene or a salt thereof with a medicinally acceptable acid.

23. 2 - phenyl - 2 - cis - hydroxymethyl - cis - N,N-dimethyl cyclohexylamine or a salt thereof with a medicinally acceptable acid.

24. 2 - phenyl - 2 - cis - acetoxymethyl - cis - N,N-dimethyl cyclohexylamine or a salt thereof with a medicinally acceptable acid.

25. A process for separating the cis- and trans-isomers of a mixture of 3-cis-dimethylamino-4-phenyl-4-cis-carbethoxy - $\Delta^1$ - cyclohexene and 3 - trans - dimethylamino 4 - phenyl - 4 - trans - carbethoxy - $\Delta^1$ - cyclohexene which comprises the steps of:

(a) forming a solution of the isomeric mixture in a strong mineral acid;

(b) adding from about a 15% to about 40% aqueous solution of zinc chloride to the solution thus formed to form a complex of zinc chloride and 3-cis-dimethylamino - 4 - phenyl - 4 - cis - carbethoxy - $\Delta^1$-cyclohexene;

(c) removing the zinc chloride - cis -isomer complex from the resulting mixture; and (d) recovering the trans-isomer from said solution.

26. The process of claim 25 wherein the strong mineral acid is 1 N HCl.

27. The process of claim 25 wherein the said solution of the isomeric mixture at step (a) has a pH of about 2.5 to about 3.5.

28. The complex of zinc chloride and 3-cis-dimethylamino - 4 - phenyl - 4 - cis - carbethoxy - $\Delta^1$ - cyclohexene produced by the process of claim 25.

29. The process of claim 25 wherein the pure cis-isomer is obtained from the zinc chloride-cis-isomer complex by the additional steps comprising:

(a) forming a solution of the complex in a strong base in the presence of an organic solvent;

(b) separating the organic phase from the solution;

(c) removing the cis-isomer from the organic solvent.

30. The process of claim 29 wherein said strong base is concentrated ammonia.

31. The process of claim 29 wherein said organic solvent is chloroform.

32. The process of claim 25 wherein in step (d) the pure trans-isomer is recovered by the steps of:

(a) adding a sufficient quantity of strong base to make alkaline the acidic solution containing the trans-isomer in the presence of an organic solvent;

(b) separating the organic phase from the mixture and removing the solvent by evaporation;

(c) recovering the pure trans-isomer by dissolving the organic residue from step (b) in a mixture of ethyl acetate and acetone and treating the solution with sufficient gasous hydrochloric acid in ethyl acetate to obtain a pH of about 3.5 to 4.

33. A process for separating the cis- and trans-isomers of a mixture of 3 - cis - dimethylamino - 4 - phenyl - 4 - cis - carbethoxy - $\Delta^1$ - cyclohexene and 3 - trans - dimethylamino - 4 - phenyl - 4 - trans - carbethoxy - $\Delta^1$-cyclohexene which comprises the steps of:
  (a) mixing the isomeric mixture with naphthalene-1,5-disulfonic acid while dissolved in a lower molecular weight aliphatic monohydroxy alcohol; and
  (b) recovering the double salt of 3 - trans - dimethylamino - 4 - phenyl - 4 - trans - carbethoxy - $\Delta^1$-cyclohexene and naphthalene - 1,5 - disulfonic acid which is precipitated from the solution;
there being present in the reaction mixture a ratio of about 1.5 mols of said naphthalene-1,5-disulfonic acid for each 2 mols of said trans-isomer present in the isomeric mixture.

34. The double salt of 3 - trans - dimethylamino - 4 - phenyl - 4 - trans - carbethoxy - $\Delta^1$ - cyclohexene prepared by the process of claim 33.

References Cited

Hunig et al.: Chem. Ber. 90, 238–45 (1957).
Langenbeck et al.: Chem. Ber. 75, 232–6 (1942).
Morrison et al.: "Organic Chemistry," 2nd edition, Allyn and Bacon, Inc., Boston, Mass., 1966, p. 669.
Rubin et al.: J. Am. Chem. Soc. 68, 828–32 (1946).

HENRY R. JILES, Primary Examiner

G. T. TODD, Assistant Examiner

U.S. Cl. X.R.

260–247.2, 293, 294.7, 326.3, 326.5, 326.87, 464, 470, 471, 571; 424—248, 267, 274, 304, 305, 325

UNITED STATES PATENT OFFICE
CERTIFICATE OF CORRECTION

Patent No. 3,557,127　　　Dated Jan. 19, 1971

Inventor(s) Gerhard Satzinger

It is certified that error appears in the above-identified patent and that said Letters Patent are hereby corrected as shown below:

Column 2, line 12, "1" should read ... I

Column 4, line 43, formula

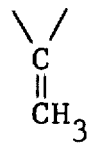　　should read　　

Column 5, line 20, formula should be identified as I(d)

Signed and sealed this 11th day of January 1972.

(SEAL)
Attest:

EDWARD M. FLETCHER, JR.　　　ROBERT GOTTSCHALK
Attesting Officer　　　　　　　Acting Commissioner of Paten